US012676806B2

(12) United States Patent
Halepovic et al.

(10) Patent No.: US 12,676,806 B2
(45) Date of Patent: Jul. 7, 2026

(54) SELECTION OF CANDIDATE DATA FLOWS FOR EVALUATING PERFORMANCE METRICS USING PASSIVE MEASUREMENTS

(71) Applicants: AT&T Intellectual Property I, L.P., Atlanta, GA (US); AT&T Mobility II LLC, Atlanta, GA (US)

(72) Inventors: Emir Halepovic, Somerset, NJ (US); Mats Elf, Kirkland, WA (US); Chan-Ching Hsu, Dublin, CA (US); Cheuk Yiu Ip, Metuchen, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 559 days.

(21) Appl. No.: 17/721,904

(22) Filed: Apr. 15, 2022

(65) Prior Publication Data

US 2023/0336455 A1     Oct. 19, 2023

(51) Int. Cl.
*H04L 43/0888*     (2022.01)
*H04L 47/10*     (2022.01)

(52) U.S. Cl.
CPC .......... *H04L 43/0888* (2013.01); *H04L 47/10* (2013.01)

(58) Field of Classification Search
CPC . H04L 43/0888; H04L 43/022; H04L 43/026; H04L 43/0876; H04L 43/20; H04L 43/091; H04L 43/10; H04L 47/10; H04L 43/028
See application file for complete search history.

(56) References Cited

U.S. PATENT DOCUMENTS 8,873,410 B2 * 10/2014 Pruthi ................. H04L 43/0852
                                                    709/224
2015/0296074 A1 * 10/2015 Shah ..................... H04W 12/08
                                                    455/418

OTHER PUBLICATIONS

Inter-Packet Delay Based Correlation for Tracing Encrypted Connections Through Stepping Stones (Year: 2002).*
A flow-based model for Internet backbone traffic (Year: 2002).*
Packet-Level Traffic Measurements from the Sprint IP Backbone (Year: 2003).*
Investigation on the IP Flow Inter-arrival Time in Large-scale Network (Year: 2007).*

(Continued)

*Primary Examiner* — Yemane Mesfin
*Assistant Examiner* — Guoxing Fan
(74) *Attorney, Agent, or Firm* — Guntin & Gust, PLC; John G. Rauch

(57) ABSTRACT

Aspects of the subject disclosure may include, for example, identifying a flow of data packets between first and second network addresses of a network, with each packet including respective header and payload portions. The identified flow of data packets is monitored over a number of sample periods to obtain a number of monitored results. A data-flow activity record is generated, having a number of symbols corresponding to the number of monitored results, the symbols including an active symbol value indicative of a presence of an exchange of data and an idle symbol value indicative of an absence of an exchange of data. A suitability of the identified data flow is inferred for estimating a throughput of the network according to the data-flow activity record without interpreting contents of each respective packet payload portion. Other embodiments are disclosed.

20 Claims, 9 Drawing Sheets

(56) References Cited

OTHER PUBLICATIONS

One-Way Traffic Monitoring with iatmon (Year: 2012).*
Time-activity footprints in IP traffic (Year: 2016).*
EMIMIC: Estimating HTTP-based Video QoE Metrics from Encrypted
Network Traffic (Year: 2018).*
A Survey on Encrypted Network Traffic Analysis Applications,
Techniques, and Countermeasures (Year: 2021).*
RFC2124 (Year: 1997).*
RFC6645 (Year: 2012).*

* cited by examiner

262　Monitor network traffic

264　Network transaction?

266　Associate network transaction with a data flow

268　Sample active/idle status of identified data flow

270　Analyze identified data flow according to samples

272　Good candidate?

274　Calculate network performance parameter(s)

276　Store data flow record

260

281 Monitor network traffic

282 Identify network transaction

284 Transaction timeout complete?  Y

N

285 New transaction?  Y

N

286 Initiate activity vector

287 Sample data flow, active/idle status of identified transaction

288 Update activity vector according to sample status

289 Identified transaction complete?

N

Y

290 Store transaction record

280

300

600

SELECTION OF CANDIDATE DATA FLOWS FOR EVALUATING PERFORMANCE METRICS USING PASSIVE MEASUREMENTS

FIELD OF THE DISCLOSURE

The subject disclosure relates to a selection of candidate data flows for evaluating performance metrics using passive measurements.

BACKGROUND

Devices may utilize a variety of network types to access data via a network. Networks may include wired networks, such as wide area networks, e.g., the Internet, metropolitan networks, and local area networks (LANs), and wireless communication networks such as W-Fi and/or cellular networks. The variety of network types can be used alone or in combination to support a delivery of data over the network (s), including transactions, in which one network-enabled device requests a network transport of data from another network-enabled device. Such transactions may include transport, e.g., download(s), of one or more objects, such as documents, text, images, video, audio, application programs, or apps, and the like.

Network operators and/or service providers strive to provide users with a positive experience, which in at least some instances, may be measured according to download speeds. In this regard, a device may request a sizeable data object, such as a high-resolution image. The image may be transported from an image server, across the network and to the requesting user device via a bundle of packets, each packet including a header portion that may include one or more of the source and destination network addresses and payload portion that may include a respective portion of the image. In at least some instances, the requesting user device may render a requested high-resolution image in stages as the packets arrive. Alternatively or in addition, the user device may display a progress bar illustrating a measure of a progress of the proportion of data or packets received. Positive user experiences include those in which delivery of content is prompt.

BRIEF DESCRIPTION OF THE DRAWINGS

Reference will now be made to the accompanying drawings, which are not necessarily drawn to scale, and wherein.

DETAILED DESCRIPTION

Figure 1:
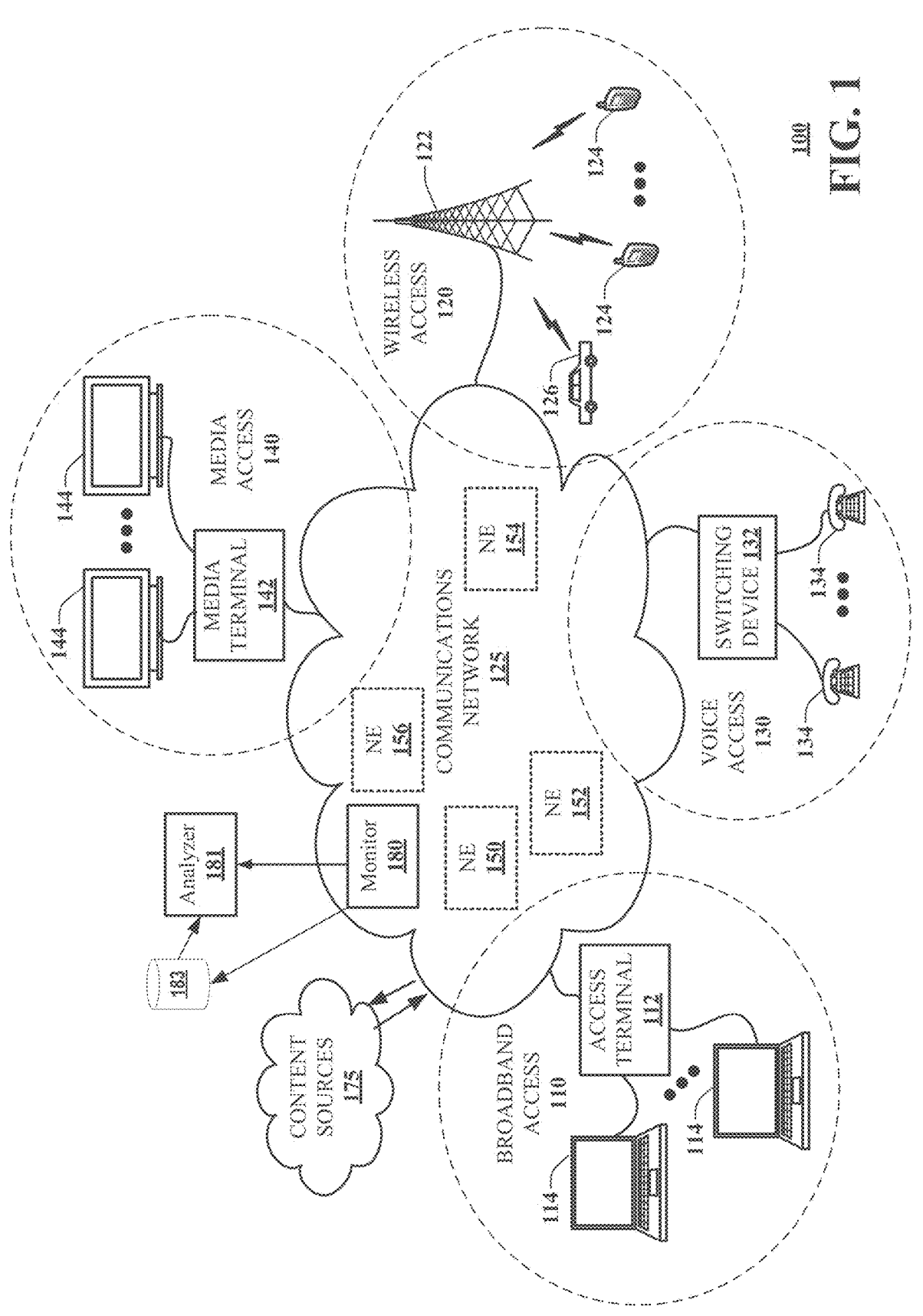
FIG. 1 is a block diagram illustrating an exemplary, non-limiting embodiment of a communications network in accordance with various aspects described herein.

The subject disclosure describes, among other things, illustrative embodiments for periodically sampling a network packet flow between a pair of devices, generating an activity record having symbols that indicate an active-idle status of each sample of the packet flow, and inferring a suitability of the packet flow for estimating a network throughput in a passive manner, without interpreting payloads of the flow of packets. Other embodiments are described in the subject disclosure.

One or more aspects of the subject disclosure include a process that includes identifying, by a processing system including a processor, a data flow to obtain an identified data flow that includes an exchange of multiple packets across a network, between a first device having a first network address and a second device having a second network address. Each packet of the multiple packets includes a respective packet header portion that identifies the first and second network addresses and a respective packet payload portion. The process further includes monitoring, by the processing system, the identified data flow over a number of successive sample periods to obtain a number of monitored results, each monitored result of the number of monitored results indicating a presence or absence of an exchange of data of the identified data flow during a respective sample period of the successive sample periods. A data-flow activity vector is generated, by the processing system. The data-flow activity vector includes a number of symbols corresponding to the number of monitored results, the number of symbols including an active symbol value indicative of the presence of the exchange of data of the identified data flow and an idle symbol value indicative of the absence of the exchange of data of the identified data flow. A suitability of the identified data flow is determined, by the processing system, for determining a throughput of the network according to the data-flow activity vector without interpreting contents of a respective packet payload portion of each packet of the multiple packets.

One or more aspects of the subject disclosure include a device having a processing system that includes a processor and a memory that stores executable instructions that, when executed by the processing system, facilitate performance of operations. The operations include identifying a data flow to obtain an identified data flow including an exchange of a group of packets between first and second network addresses of a network. Each packet of the group of packets includes a respective packet header portion that identifies the first and second network addresses and a respective packet payload portion. The identified data flow is monitored over a number of successive sample periods to obtain a number of monitored results. Each monitored result of the number of monitored results indicates a presence or absence of an exchange of data of the identified data flow during a respective sample period of the number of successive sample periods. A data-flow activity record is generated that includes multiple symbols corresponding to the number of monitored results. The multiple symbols include a first symbol value indicative of the presence of the exchange of data of the identified data flow and a second symbol value indicative of the absence of the exchange of data of the identified data flow. A suitability of the identified data flow is determined for estimating a throughput of the network according to the data-flow activity record without interpreting contents of the respective packet payload portion of each packet of the group of packets.

One or more aspects of the subject disclosure include a non-transitory, machine-readable medium, including executable instructions that, when executed by a processing system including a processor, facilitate performance of operations. The operations include identifying a data flow to obtain an identified data flow that includes an exchange of a number of packets between first and second network addresses of a network. Each packet of the number of packets includes a respective header portion and a respective payload portion. The identified data flow is monitored over a number of sample periods to obtain a number of monitored results and a data-flow activity record is generated. The data-flow activity record includes a number of symbols corresponding to the number of monitored results. The number of symbols includes an active symbol value indicative of a presence of an exchange of data of the identified data flow and an idle symbol value indicative of an absence of an exchange of data of the identified data flow. A suitability of the identified data flow is inferred for determining a throughput of the network according to the data-flow activity record without interpreting contents of each respective packet payload portion.

As mentioned above, network operators and/or service providers strive to provide users with a positive user experience by deploying networks that provide sufficient capacity in at least most instances. Too often though, competition and congestion due to network demands of diverse numbers and types of applications create highly variable data rates, which may impact end-to-end throughput. At times, such reductions in throughput may be perceptible and, quite possibly, substantial. The techniques disclosed herein support measurements of throughput, e.g., how fast network currently allows to transmit data, as may result in experienced data and/or data object download times.

Requests for object downloads may result from a user browsing posts on social media applications, news items, and/or downloading an app from an app store. Data transfers, such as the example downloads, may be evaluated according to transactions, in which one or more objects are requested from and/or provided by a data provider or source. It is understood that at least some transactions may include multiple small objects that may be downloaded individually and/or sequentially according to the transaction, e.g., an image, a post, an advertisement. In such instances, there may be at least some delay time between downloads of individual objects, such that an evaluation of the entire transaction may not provide a realistic indication of throughput, e.g., underestimating it by including interstitial delays. It is also recognized that how fast objects are downloaded, individually, could determine user experience.

Accordingly, it would be advantageous to distinguish data flows associated with the individual objects to permit throughput performance calculations on a per-object basis, which is more representative of what the end user experiences. In at least some instances, objects of a multi-object transaction may be determined by inspecting and/or otherwise interpreting a payload portion of one or more packets of a corresponding packet stream. Inspection of the packets may include interpreting data contained therein, e.g., to identify an application, an object, and any other detail as may be utilized to distinguish among different objects. Traditionally, most network/download traffic has occurred over hypertext transfer protocol (HTTP), which provides a verbose application layer protocol allowing a packet monitor to distinctly recognize requests and responses, and in at least some instances, e.g., on download side, to recognize a beginning and/or an end of the response. In at least some instances, Web proxy servers may be deployed to determine and/or provide lists of such transactions as may be usable to evaluate a per-object network throughput. For example, a smartphone requests a homepage of a news outlet, such as CNN.com. The provider initiates a response to the user request that may consist of multiple objects, e.g., twenty objects or distinguishable responses. Based on the verbose application layer protocols and/or deep packet inspection, each object having a corresponding data size, may be distinguished by exact times of transmission start and transmission end, which would allow for direct computations of throughput.

According to recent trends, however, a greater portion of network transactions are encrypted, protected and/or otherwise obfuscated. Such encryption may prevent evaluation of underlying protocol details, such as application layer protocols, and/or deep packet inspection, leaving a network operator to evaluate packets at a high-level, e.g., according to a header that identifies source and destination addresses and a payload portion that contains encrypted and/or obfuscated data.

When faced with an encrypted flow, a network operator may be able to identify a data transfer from one IP address to another IP address based on unencrypted packet header information. Unfortunately, however, the network operator may not be able to distinguish whether the data flow includes one or more than one requests and/or objects, because content of the data flow, e.g., a packet payload portion, is obscured by the encryption. If the transaction happens to include multiple objects, there may be idle time between delivery of the different objects. Consequently, evaluation of a throughput of an entire transaction, which may have multiple objects, risks underestimating because idle times inside transaction should be subtracted. If messages are encrypted, the network operator would be unable to determine idle time. Beneficially, the techniques disclosed herein permit inferences that data flows are associated with a single object, by sampling packet flow, assigning sampled packets to a particular data flow or transaction and monitoring data transfer activity or inactivity, as the case may be, according to each sample period. Records of the sampled activity may be generated for data flows and evaluated to draw inferences as to suitability of the data flow for evaluating network performance, such as throughput.

Many of the most popular transactions today relate to streaming video, which is known to include significant amounts of idle time in each transaction, e.g., as a result of video buffers being filled and/or delays due to processing and display timing. Consequently, a substantial amount of network traffic may be unusable for determining network performance. For example, half of all data on the network may be attributable to streaming video, which results in flows that are not useful for measuring network throughput. It becomes increasingly important to distinguish suitable data flows, which may be further complicated by the use of encryption and/or obfuscation. A network operator's dilemma is further exacerbated by newer transport protocols, such as Google's QUIC transport protocol, which enables combining multiple flows into a single flow. Considering that each flow may have multiple transactions, and now multiple flows may be put onto a common QUIC connection.

According to the techniques disclosed herein, when a network operator, e.g., a network monitor, "sees" a data flow, it next determines whether the flow is a suitable or "good" candidate for measuring throughput of network, i.e., how fast the network allows downloads. If the network operator is able to confidently measure throughput, they can manage their network in a manner to improve user experience, e.g., provisioning new cells, sectors, cell towers, and the like, to provide more capacity.

Some video services may open one flow according to 4-tuple that provides source and destination IP addresses and source and destination ports. With respect to a destination that is server side, a destination port is usually the same, e.g., 443, indicating either secure HTTP or transport over QUIC. IP addresses may be converted to domain names, permitting recognition of some services by their domain names, i.e., by their IP addresses, such as NETFLIX® and/or YouTube® video services. According to the illustrative techniques, a network operator does not need to identify this level of detail in order to determine throughput passively sampling packet flows. Rather, the network operator simply recognizes dynamics of data transmission within a flow in a certain direction, e.g., object download time.

Referring now to FIG. 1, a block diagram is shown illustrating an example, non-limiting embodiment of a communication system 100 in accordance with various aspects described herein. For example, communication system 100 can facilitate in whole or in part, identifying a flow of data packets between first and second network addresses of a network, with each packet including respective header and payload portions. The identified flow of data packets is monitored over a number of sample periods to obtain a number of monitored results. A data-flow activity record is generated, having a number of symbols corresponding to the number of monitored results, the symbols including an active symbol value indicative of a presence of an exchange of data and an idle symbol value indicative of an absence of an exchange of data. A suitability of the identified data flow is inferred for estimating a throughput of the network according to the data-flow activity record without interpreting contents of each respective packet payload portion. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example communication system 100 includes a data-flow monitor 180 that is adapted to monitor packets exchanged across the communications network 125, to associate the monitored packets with endpoints, e.g., source and destinate network addresses, and to associate monitored packets with data flows according to pairs of endpoints. The data-flow monitor 180 may be configured within a portion of the network such as the communications network 125, to inspect header portions of monitored packets to obtain network addresses, such as source and destination IP addresses, which may be used to associate a packet with a particular data flow.

In at least some embodiments, the data-flow monitor 180 is adapted to conduct packet monitoring or sampling at multiple times over an observation period. Monitoring may identify source and destination addresses, as well as an indication whether the data flow was active, e.g., that a packet may have been observed within a sample period, or perhaps that a packet was observed having a payload exceeding a predetermined payload threshold size. Alternatively or in addition, monitoring identifies whether the data flow was inactive or idle, e.g., that no packet was observed within the sample period, or perhaps that a packet was observed having a payload below a predetermined payload threshold size. In at least some embodiments, the data-flow monitor 180 determined active and/or idle statuses of each sample period without accessing and/or otherwise interpreting contents of a packet payload. Thus, active and/or idle status may be obtained for packets in which the payload portion is encrypted, without requiring an encryption key and without requiring decryption of the payload portion.

The data-flow monitor 180 may be adapted to combine samples of a data flow into a data-flow descriptor or record indicating active and/or idle status of the data flow according to each sample. By way of example, the data-flow descriptor may utilize symbols, with one symbol relating to an active status and another symbol relating to an idle status. For applications using two states, binary digits may be used to represent samples of a data-flow record. Namely, a "1" may be used to represent an active data flow and a "0" may be used to represent an idle data flow. The 1's and 0's may be concatenated according to successive samples of an observation window to obtain a binary array or vector, e.g., a data-flow activity vector.

In at least some embodiments, a length of the observation window may be determined according to predetermined observation period, e.g., a predetermined number of seconds, such as a few seconds, tens of seconds, or more. Alternatively or in addition the length of the observation window may be determined according to a start and/or end time of a data flow between a pair of network addresses. In such instances, a maximum time threshold may be determined to distinguish different packet flows between the same network endpoints. For example, an idle status observed for a number of sample periods, e.g., a number of adjacent and/or successive sample periods, exceeding a threshold value may be interpreted as an indication that a data flow has terminated. To the extent an active status is subsequently observed, it may be interpreted as a different data flow. It is understood that data flows may be associated with network transactions in which an object is transported from one network address to another.

In some embodiments, sample periods may be sequential, e.g., being repeated according to a sample period. A duration of a sampling action may occur over a portion of the sample period, e.g., extending from a fraction of the sample period up to and including the entire sample period. For example, in some embodiments using a one second sample period, the sampling action may occur over the entire one second period, such that data packets occurring at any time within the one second sample period would be captured by the sampling action. Alternatively or in addition, the sampling may occur over a portion of the example one second sample period, e.g., with the sampling action occurring over a first half second or first tenth second of the one second sample period, such that any packets observed within the first half second or first tenth second of the sample period may be captured by the sampling action. In at least some embodiments, sampling may be successive, such that an end of one sample corresponds to a beginning of another sample, e.g., as illustrated by the samples 227 illustrated in FIG. 2B described below.

In at least some embodiments, the data-flow monitor 180 may store data-flow records. Data-flow records may include the data-flow activity vectors. It is envisioned that data-flow records may include one or more additional features, such as one or more of a data-flow start time, a data-flow end time, a data-flow duration, a data-flow quantity, e.g., data volume. The data volume may be determined according to observed packet sizes and/or observed packet payload sizes. Time values may be time-of-day. Alternatively or in addition, time values may be relative, e.g., to a clock source, such as a network timing source. For example, a data-flow records for a data-flow observed over 8 one-second sample intervals may include a 1-byte activity vector, a data flow duration, e.g., 8 seconds determined according to the samples and a single data volume determined as an aggregate of the packet sizes, e.g., 8× packet size.

The object may be in a form of a transaction, e.g., in which a data source provides data content requested by a data recipient. Data may include, without limitation, documents, HTML files, executable files, e.g., applications, images, audio content, digital image content, video content, e.g., streaming media, real-time data, such as VoIP, and the like. In some examples, a data recipient may request content from a Web page that includes multiple images, in which separate transactions may be conducted for each image of the requested web page. It is understood that the separate transactions or images may be distinguished according to the sampling techniques disclosed herein, without necessarily requiring that the data-flow monitor 180 access and/or otherwise interpret packet payload content.

The times may be periodic, e.g., according to a sample interval, such as a fraction of a second, a second, multiple seconds, and so on. Alternatively or in addition, the times may be aperiodic, e.g., responsive to a predetermined aperiodic sample interval schedule, and/or responsive to an event. Events may include, without limitation, traffic volume of the network, with different sample periods being prescribed for different threshold levels of traffic volume, e.g., sampling more rapidly when network traffic increases above a predetermined traffic threshold. Alternatively or in addition, events may include a time of day, e.g., during periods of anticipated high traffic volume and/or low volume, as may be associated with business hours, primetime viewing hours, and so on.

In at least some embodiments, sample times may be determined according to at least one address of a pair of network addresses of a monitored traffic flow. It is understood that in at least some embodiments, a network operator may determine and/or otherwise maintain a record, e.g., a dictionary, of IP addresses that may be associated with certain applications and/or entities, e.g., an IP address of the Hulu® streaming service, an IP address of a NASA server providing access to Hubble images, and so on.

The example communication system 100 also includes a data-flow analyzer 181 in communication with the data-flow monitor 180. The data-flow analyzer 181 receives and/or otherwise accesses data-flow records generated by the data-flow monitor 180. In some embodiments, the data-flow monitor 180 passes data-flow records to the data-flow analyzer 181. For example, in real-time and/or near real-time applications, sample sizes may be fixed, regardless of data-flow durations, such that fixed-size portions of a data-flow may be passed to the data-flow analyzer 181 for real-time and/or near real-time analysis. Alternatively or in addition, the data-flow monitor 180 may store data-flow records in a data-flow record repository 183.

The data-flow analyzer 181 may obtain data-flow records from the repository 183 for analysis at any time. For example, the data-flow analyzer 181 may obtain data-flow records periodically, e.g., after a conclusion of a data-flow observation period, such as at the end of a day, a week, a month, or any other observation period. The data-flow analyzer 181 may be adapted to perform analyses in a batch mode, e.g., analyzing data-flow records obtained and stored for multiple data flows. The multiple data flows may include different data flows involving the same network endpoints, different data flow directions of the same network endpoints and/or different data flows associated with different network endpoints.

The data-flow analyzer 181 may be adapted to perform one or more different types of data-flow analyses. At least some of the data-flow analyses evaluate data-flow records to determine whether the corresponding data flow provides a data flow that is suitable for determining a measure of network performance. Measures of network performance may include, without limitation a measure of network throughput, such as a data volume transmitted over a duration of the corresponding data-flow, e.g., as may be measured in bytes/second. According to the techniques disclosed herein, such determinations of suitability may be based upon inferences drawn at least in part from the data-flow activity vector. Beneficially, such inferences may be drawn without requiring insight into identities of network endpoints and/or entities, associated applications, content of packet payload data, and so on. In particular, inferences of suitability may be drawn for encrypted and/or otherwise masked or obfuscated data flows, without requiring any level of decryption, deciphering and/or de-obfuscation.

The data flow-analyzer 181, upon determining a packet flow represents a suitable candidate for network performance analysis, may alter and/or otherwise mark the data-flow record to indicate a determination of suitability. Such modified data-flow records may be evaluated further, e.g., to evaluate a network performance criteria upon which the determination of suitability was based. By way of example, a data-flow determined suitable for inferring network throughput may be evaluated to determine and/or otherwise estimate network throughput responsive to the determination of suitability. In at least some embodiments, the data-flow analyzer 181 is adapted to perform further analyses to determine a network performance criteria responsive to determining a suitability of a particular data flow and/or data-flow record. The further analyses may include, without limitation, an estimation of data throughput based upon a data-flow duration and a data-flow volume, e.g., as a ratio of the data-flow volume to the data-flow duration, in bytes/second.

Figure 2A:
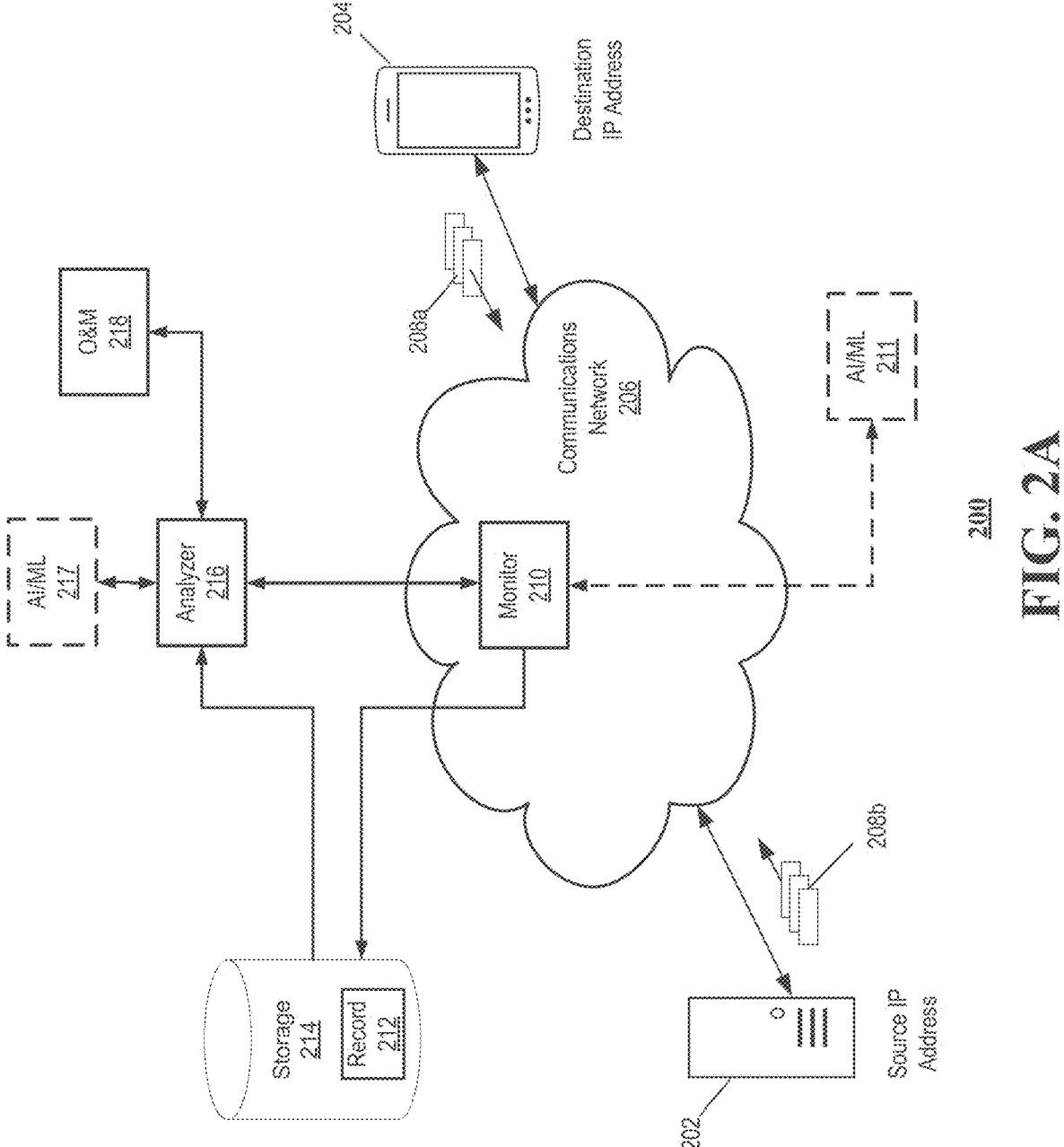
FIG. 2A is a block diagram illustrating an example, non-limiting embodiment of a network monitoring system functioning within the communication network of FIG. 1 in accordance with various aspects described herein.

FIG. 2A is a block diagram illustrating an example, non-limiting embodiment of a network monitoring system 200 functioning within the communication network 100 of FIG. 1 in accordance with various aspects described herein. According to the illustrative example, a packet flow occurs between a data source 202, e.g., a network server, a web server, a streaming media server, and the like, and a data recipient 204, e.g., a mobile device, such as a mobile phone, a tablet, a notebook computer, a smart TV, a smart vehicle, a network-enabled appliance, e.g., virtually any network-enabled device according to the Internet of Things (IoT), and the like.

It is envisioned that data may flow in either or both directions between the data source 202 and the data recipient. For example, the data recipient may initiate a first, or uplink packet flow 208*a* directed to the data source 202. The uplink packet flow 208*a* may include a request for content of a Web page that may include multiple objects. The objects may include text, images, video, sound of the Web page, and so on. The data source 202, in turn, may initiate a second, or downlink packet flow 208*b* responsive to the uplink packet flow 208*a* and directed to the data recipient 204. According to the illustrative example, the downlink packet flow 208*b* may include multiple transactions, e.g., having individual transactions for each of the objects associated with the requested Web page. In assessing network throughput, it may be beneficial to evaluate throughput for each object instead of an overall throughput for delivery of the bundle of objects associated with the requested Web page.

The uplink and downlink packet flows 208*a*, 208*b* may be routed through a communication network 206, according to one or more networking protocols. At least some network protocols, such as IP, generally define a packet structure, e.g., distinguish a packet header portion from a packet payload portion. The packet header portion may include, among other fields, IP addresses of sender and a recipient. Thus, packets of the downlink packet flow 208*b* would include a source IP address of the data source 202 and a destination IP address of the data recipient 204. The packet payloads may include chunks of data corresponding to the groups of objects. In at least some embodiments, the data source 202 provides sequential transactions for each object of the group of objects associated with the requested Web page. It is envisioned that there may be at least some minimal delay between packet flows of the individual objects that may be usable to distinguish individual transactions of the requested Web page from each other.

The example network monitoring system 200 includes a network monitor 210 in communication with one or more components of the communications network 206 and/or one or more of the data source 202 and/or the data recipient 204. The network monitor 210 observes packet traffic across at least that portion of the communication network 206 that serves communications between the data source 202 and data recipient 204. According to the packet traffic observations, the network monitor 210 identifies source and destination addresses for each packet. The network monitor 210 may associate the source and destination addresses with a packet flow, or a data flow. Packet traffic observations may be repeated in a like manner in order to obtain a time sequence of packet traffic. Once a packet flow has been identified, the network monitor 210 may determine whether there is an associated active data transfer or whether the data transfer activity is idle for that sample. The network monitor 210 may create a record of the activity samples, e.g., according to an array or vector. A binary vector of 1's and 0's may be used to identify periods of activity and/or inactivity for an identified data flow.

In at least some embodiments, the example network monitoring system 200 includes a storage device 214 or system. The example storage device is in communication with the network monitor 210 and adapted to store network monitoring records, e.g., data-flow activity records 212. The data-flow activity records may include an indicator, e.g., data flow identifier (ID) and the data-flow activity array or vector. The data flow ID may include the IP source and destination addresses. Alternatively or in addition, the data-flow activity records may include one or more other data-flow parameters, such as one or more of a data-flow start time, a data-flow end time, a data-flow duration, an associated amount of data, e.g., a data quantity or volume, associated with the entire data flow.

The example network monitoring system 200 also includes a data-flow analyzer 216. The data-flow analyzer may be in communication with one or both of the network monitor 210 and the storage device 214. The data-flow analyzer 216 may be adapted to evaluate the data-flow records provided by the network monitor 210 and/or the data-flow activity records 212 as may be retrieved from the storage device 214. In at least some embodiments, the data-flow analysis is adapted to evaluate the data flow record and to determine based upon the evaluation whether the associated data-flow represents a suitable candidate for evaluating a network performance metric, such as network throughput. For systems in which the data-flow vector provides 1's representing sample periods of activity and 0's representing sample periods if inactivity, the data-flow analyzer 216 may perform one or more calculations based at least in part on the 1's and 0's of the data-flow vector.

For example, the data-flow analyzer 216 may calculate a total number of 1's, representing a total number of sample periods during which there was network transfer activity. The data-flow analyzer 216 may compare the total number of 1's to an activity threshold, such that a data-flow in which the total number of 1's exceeds the activity threshold may be identified as a suitable candidate for evaluating the network performance metric. Alternatively, a data-flow in which the total number of 1's does not exceed the idle threshold may be identified as a non-suitable candidate for evaluating the network performance metric.

Alternatively or in addition, the data-flow analyzer 216 may calculate a total number of 0's, representing a total number of sample periods during which there was no substantial network transfer activity. The data-flow analyzer 216 may compare the total number of 0's to an idle threshold, such that a data-flow in which the total number of 0's exceeds the idle threshold may be identified as a non-suitable candidate for evaluating the network performance metric. Alternatively, a data-flow in which the total number of 0's does not exceed the idle threshold may be identified as a suitable candidate for evaluating the network performance metric.

Alternatively or in addition, the data-flow analyzer 216 may calculate a total number of 1's, representing a total number of sample periods during which there was network transfer activity and the total number of 0's during which there was no network transfer activity. The data-flow analyzer 216 may calculate a ratio of the total number of 1's to the total number of 0's, or a total number of 1's to a total number of samples, i.e., total number of 1's and 0's of the data-flow activity vector. The calculated ratio may be compared to an activity ratio threshold, such that a data-flow in which the ratio of 1's to total samples exceeds the activity ratio threshold may be identified as a suitable candidate for evaluating the network performance metric. Alternatively, a data-flow in which the ratio of 1's to total samples does not exceed the activity ratio threshold may be identified as a non-suitable candidate for evaluating the network performance metric.

Without limitation, the data-flow analyzer 216 may apply other rules, e.g., detecting consecutive number of sample intervals having the same value, e.g., an active or idle state, or some other predetermine pattern of 1's or 0's. In at least some embodiments, the data-flow analyzer 216 may ignore leading and/or trailing 0's. In at least some embodiments, a data-flow duration may be adjusted according to a number of leading and/or trailing 0's that are left off. For example an 8 one-second sample activity vector having two trailing vectors may have an original data-flow duration of 8 seconds. However, when the two trailing 0's are truncated, the data-flow duration may be reduced accordingly, i.e., to 6 seconds. A network throughput parameter may be determined according to the adjusted data-flow duration to provide a better estimate of network throughput.

In at least some embodiments, the network monitor 210 may include one or more rules or logic adapted to evaluate packet-flow activity samples. Such evaluations may be used to determine initiation and/or conclusion of a data flow of a single transaction. For example, an initial activity, i.e., a "1", observed for packet transfer between a pair of IP address for which there had been no activity for at least a minimum threshold period of time, may be interpreted as an initiation of a new data flow. Similarly, a string of consecutive samples of inactivity may be interpreted as an indication that a data-flow has concluded. A threshold consecutive string of zeros may be predetermined, e.g., as a fixed number, e.g., two, three, five, and the like. Alternatively or in addition, a threshold consecutive string of zeros may be based upon a sample time, e.g., in which the number of consecutive zeros corresponds to a threshold time interval, e.g., 2 seconds, 3, seconds, 5 seconds, and so on. In at least some embodiments, a threshold for the consecutive string of zeros may be based upon a sample size, e.g., as a percentage or ratio of total sample size.

The example network monitoring system 200 may include an operation and maintenance (O&M) system 218. The O&M system 218 may be in communication with the data-flow analyzer 216 and/or one or more other system elements, such as the storage device 214 and/or the network monitor 210. In at least some embodiments, the O&M system 218 may receive a complete calculation result providing a network performance parameter determined by the data-flow analyzer 216 based upon the data-flow activity records 212. The O&M system 218 may utilize the received network performance parameters to further operation and/or maintenance of the network. For example, the O&M system 218 may generate a service request based upon an indication that the network performance parameter, e.g., network throughput, is not meeting a design goal. Alternatively or in addition, the O&M system 218 may utilize the received network performance parameters to generate network enhancements, such as deployment of additional network elements, cell towers, sectors, and the like.

In at least some embodiments, the example network monitoring system 200 may include a first artificial intelligence/machine learning (AI/ML) module 211 (shown in phantom). The first AI/ML module 211 may be incorporated in whole or in part into the network monitor 210. Alternatively, the first AI/ML module 211 may be in communication with the network monitor 210. The first AI/ML module 211 may include a neural network, such as a deep learning neural network that may be trained using training data, to support one or more functions of the network monitor 210. For example, the first AI/ML module 211 may be trained and deployed to recognize one or more parameters of a data flow, such as a data flow initiation, a data flow termination, and the like. Accordingly, the data-flow activity records 212 may be obtained at least in part based upon training and deployment of the first AI/ML module 211.

In at least some embodiments, the example network monitoring system 200 may include a second artificial intelligence/machine learning (AI/ML) module 217 (shown in phantom). The second AI/ML module 217 may be incorporated in whole or in part into the data-flow analyzer 216. Alternatively, the second AI/ML module 217 may be in communication with the data-flow analyzer 216. The second AI/ML module 217 may include a neural network, such as a deep learning neural network that may be trained using training data, to support one or more functions of the data-flow analyzer 216. For example, the second AI/ML module 217 may be trained and deployed to recognize a data flow as a suitable candidate for evaluating a network performance parameter. In at least some embodiments, suitability may be based upon the particular arrangement of 1's and 0's of the data-flow activity vector. Accordingly, the suitability of a data flow as a candidate for further network performance analysis, e.g., network throughput, may be obtained at least in part based upon training and deployment of the second AI/ML module 217.

Figure 2B:
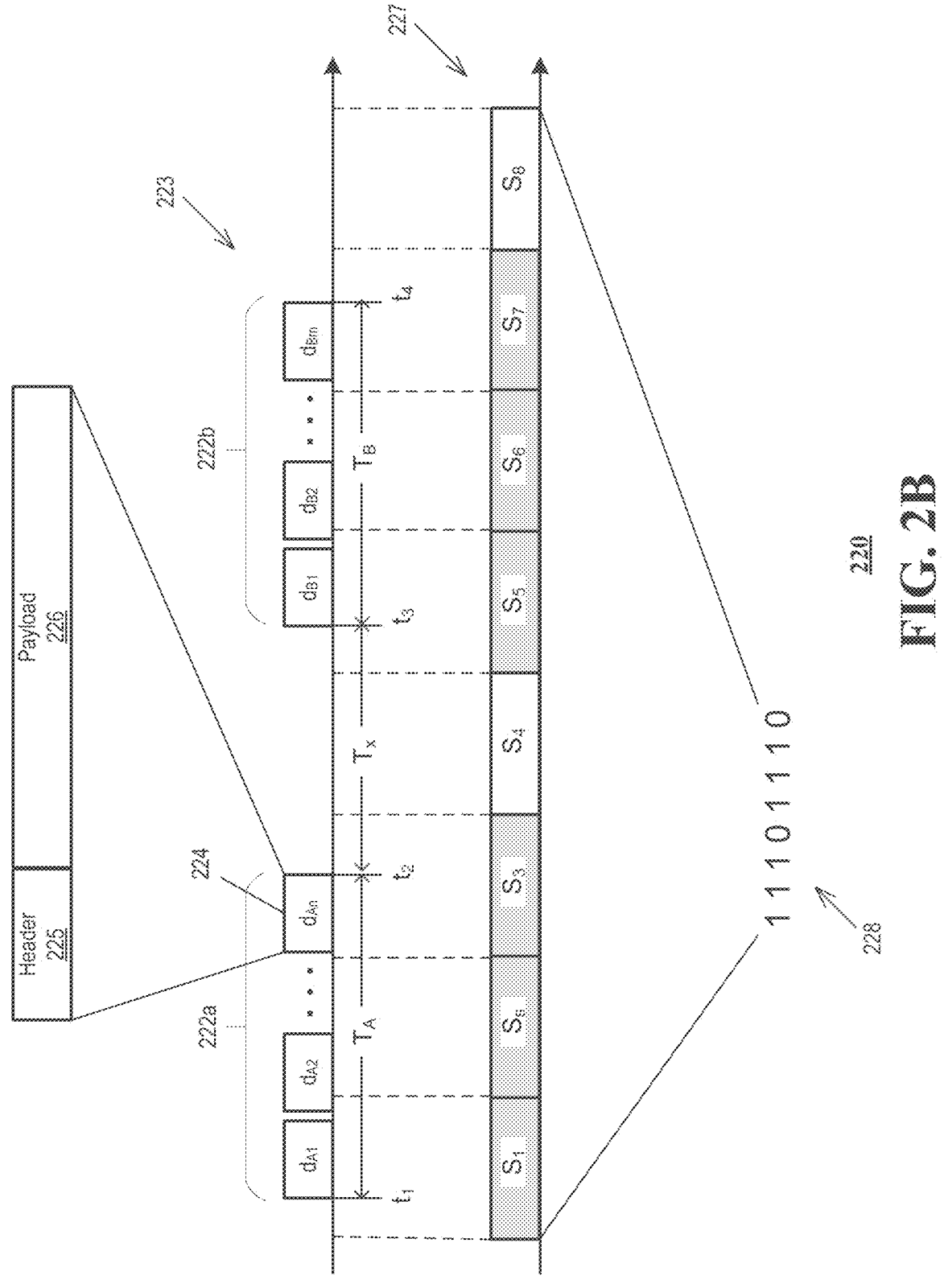
FIG. 2B is a schematic diagram illustrating an example, non-limiting embodiment of a sampled data flow obtained by the example network monitoring system of FIG. 2A in accordance with various aspects described herein.

FIG. 2B is a schematic diagram illustrating an example, non-limiting embodiment of a sampled data flow 220 obtained by the example network monitoring system 200 of FIG. 2A in accordance with various aspects described herein. An example packet flow 223 includes a first group of packets 222a extending between times $t_1$ and $t_2$, and a second group of packets 222b extending between times $t_3$ and $t_4$. An example packet 224 of the first group of packets 222a is further detailed according to a packet header portion 225 and a packet payload portion 226. The packet header portion may include information, such as a packet source and/or a packet destination, as may be prescribed according to an applicable packet transfer protocol. According to IP the packet header portion 225 includes a source IP address and a destination IP address. The packet payload portion 226 may include data associated with a packet request, a response to a packet request, e.g., according to an application type, a file type.

It is understood that in at least some embodiments, the packet payload portion 226 may be encrypted, encapsulated, and/or otherwise obfuscated, such that interpretation of data of the packet payload portion 226 would not be possible without special provisions to decrypt, decipher, and/or otherwise de-obfuscate the payload portion. The various techniques disclosed herein permit making an assessment as to whether a data flow of packets, including encrypted/obfuscated packets, without interpreting and/or otherwise evaluating any contents of the packet payload portion 226, other than a determination of its size, e.g., length in bytes.

According to the illustrative example, a sequence of samples 227 is illustrated. The example sequence of samples 227 are aligned with the packet flow 223. To the extent a data flow is identified according to the packet header portion 225, a sample may be obtained from each sample interval indicating whether or not data flow activity, e.g., the example packet 224 including the packet payload portion 226 was observed within the respective sample interval. To the extent a packet of the identified data flow was observed, a corresponding symbol, e.g., a "1", may be assigned to and/or otherwise associated with the sample interval. Otherwise, a "0" may be assigned to and/or otherwise associated with the sample interval.

Continuing with the illustrative example, samples $S_1$, $S_2$ and $S_3$ return data transfer activity of the first group of packets 222a. Likewise, samples $S_5$, $S_6$ and $S_7$ return data transfer activity of the first group of packets 222b. Subsequent samples, $S_8$ and beyond return zero values, as no packets are observed during these subsequent samples. The example packet flow 223 includes a first group of packets 222a having a start time of $t_1$ and a termination time of $t_2$, such that a first packet-flow duration may be determined as the difference $t_2-t_1$. The example packet flow 223 includes a second group of packets 222b having a start time of $t_3$ and a termination time of $t_4$, such that a first packet-flow duration may be determined as the difference $t_4-t_3$. There is a delay, $T_x$, between the groups of packets 222a, 222b that may be determined as a difference between the end time $t_2$ of the first group of packets 222a and a start time $t_3$ of the second group of packets 222b. It is worth noting that, despite the simplistic examples, there may be tens or even hundreds of packets occurring within a sampling interval as short as ¼ second.

The example includes a data-flow activity vector 228, including the binary string "11101110", with 1's representing data-flow activity and 0's representing data-flow inactivity of the identified data flow. It is understood that the example scenario may include two transactions, one transaction associated with each of the first and second packet flow 222a, 222b. The two transactions separated by a time gap $T_x$. In such instances, the data-flow activity vector 228 may be interpreted as two separate transactions between the same network endpoints. Alternatively, the example scenario may include a single transaction in which there is a one sample idle gap $S_4$. According to this interpretation, the result is a single data-flow activity vector 228, including an internal 0.

Figure 2C:
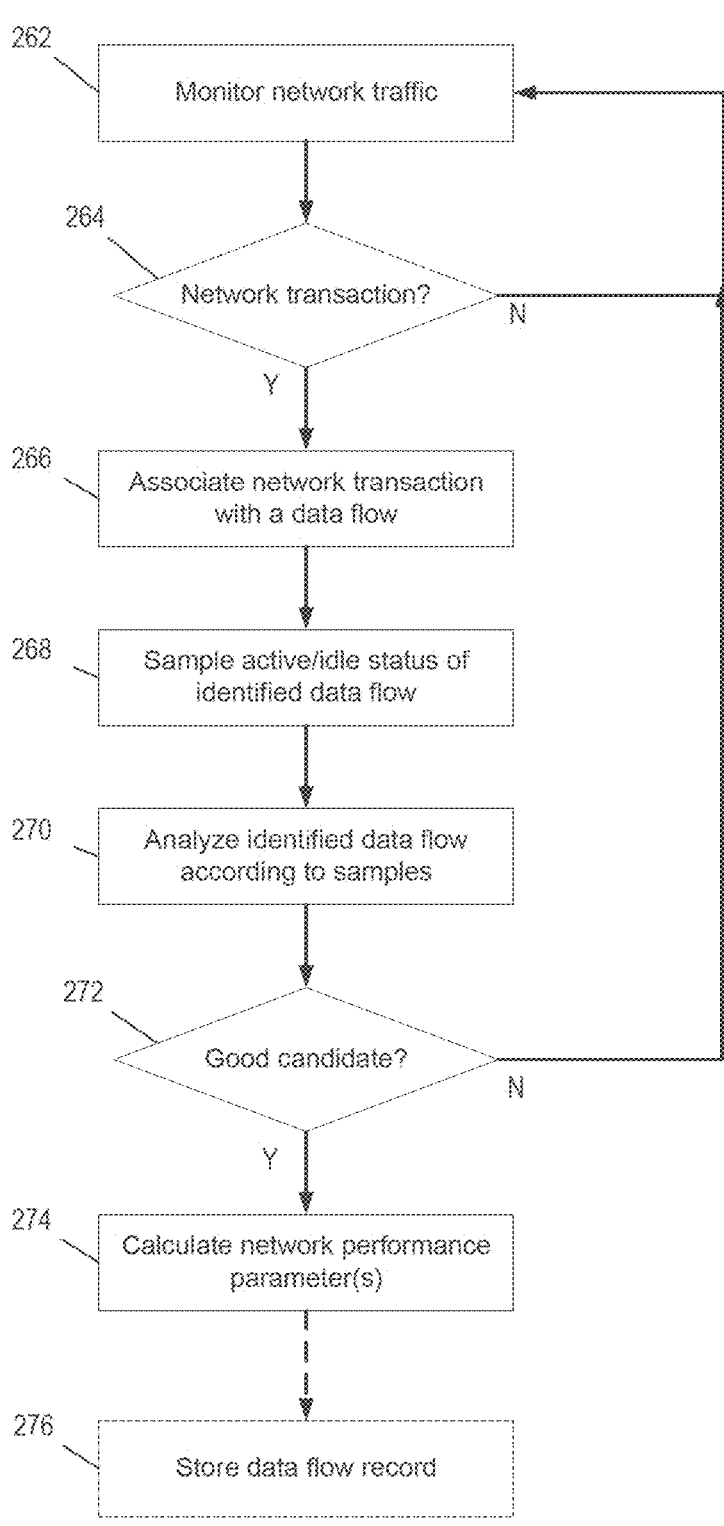
FIG. 2C depicts an illustrative embodiment of a network monitoring process in accordance with various aspects described herein.

FIG. 2C depicts an illustrative embodiment of a network monitoring process 260 in accordance with various aspects described herein. The network monitoring process 260 monitors network traffic at 262. Monitoring may include inspecting packet traffic. Such inspection may include inspection of packet headers, e.g., IP packet headers, to identify attributes that may be used to identify a packet with a packet flow. Such identification may be based on one or more packet attributes, such as source and/or destination addresses, e.g., an IP source and destination addresses as may be observed within a header portion of an IP packet. Source and destination addresses associate an inspected packet with a packet source, e.g., a data or service provider, and a packet destination, e.g., a data or service consumer, and may serve as indicators that the inspected packet is part of a transaction between the source and destinate addresses.

A determination is made at 264 as to whether the monitored network traffic includes a network transaction. For example, monitored traffic that includes data packets having a header portion that identifies the packet's source and/or destination address, may be an indication that the observed packet is part of a network transaction between equipment at the source and destination addresses. In at least some instances, an observed packet having source and destination addresses, may be sufficient to consider the packet as being associated with a possible network transaction. Alternatively or in addition, an association of the observed packet with a possible network transaction may be based on additional information, such as an identity of a data source entity, a data consumer entity, a data type, and associated application, results of previous inspections of similar packets, and so on.

For example, at least some addresses may be associated with recognizable entities. To the extent one or both of the source and/or destination addresses are associated with a recognizable entity, the determination at 264 as to whether the monitored network traffic, i.e., the packet, may belong to a network transaction may be based at least in part on the recognized entity. In at least some embodiments, at least some IP addresses may be recognizable, e.g., according to their IP address and/or their domain names may be obtained from a domain name search.

To the extent it is determined at 264 that the monitored traffic item, e.g., an inspected packet, is not a network transaction, the network monitoring process 260 may resume monitoring other network traffic, e.g., other packets, at 262. However, to the extent it is determined at 264 that the monitored traffic corresponds to a network transaction, the monitored traffic is associated with a data flow at 266. In at least some embodiments, a data flow is determined and/or otherwise identified by a pair of source and destination addresses of a data packet. The data flow may be further identified by an ordering of the pair of source and destination addresses, such that a bidirectional exchange of data packets between the same network addresses may be distinguishable by a direction of the packet flow. Namely, a source-destination pair of addresses A and B, in that order, may represent a download data flow from A to B, whereas source-destination pair of the same addresses B and A, in a reverse order, may represent an upload data flow from B to A.

It is understood that in at least some instances a packet associated with a data flow may represent a first packet of the data flow, in which instance, the data flow may have not yet been identified. Accordingly, the network monitoring process 260 may include provisions to identify packets having pairs of addresses not yet associated with existing data flows as potential data flows. Subsequent packets having the same pairs of addresses may be associated with prior packets identified as potential data flows. Such associations of subsequent packets may be interpreted by the network monitoring process 260 as confirming the packets are associated with a data flow. It is understood that a timing aspect may be relied upon, such that any observation or sampling of a second packet that confirms a packet of a potential data flow must occur within some time window, e.g., a number of packet sample periods, in order to confirm a potential data flow. Otherwise, a tracking of the packet of the potential data flow may be cleared and/or otherwise forgotten.

To the extent that the packet is associated with a data flow, an active-idle status of the data flow may be determined at 268. It is understood that in at least some embodiments, the network monitoring process 260 proceeds according to a sample period. That is, the monitoring of the network traffic at 262 may be performed over a time sequence of samples, e.g., once per fraction of a second, once per second, once per every few seconds and so on. The presence of absence of a network transaction at 264 may include consulting a reference, or stored record that a network transaction associated with a data flow may have been observed during a preceding example, and presumed to be ongoing. In such instances, it is further conceivable that during any particular sample, there may be no packets associated with that particular data flow. Such observations may be indicative of a particular sample of a particular data flow as being inactive or idle. To the contrary, an observation at 268 that a data packet was observed for the particular sample of the particular data flow as being active.

In at least some embodiments, a sequence of samples of a particular data flow may be stored according to a data-flow record. Such binary status information, such as active or passive, may be represented by a binary symbol, such that a sequence of successive samples of the particular data flow may be recorded in a binary array or vector of 1's and 0's, representing activity and/or inactivity of the identified data flow during the corresponding sample period. It is understood that that data flows may be associated with transactions in which a data object is being transferred from one IP address to another. The data object may be any data suitable for transport over the communication network, such as the various examples disclosed herein and/or otherwise generally known.

At least some of the transactions may have a definable start, representing a packet or group of packets associated with an initiation of a transfer of a data object, and a definable end, representing another packet or group of packets associated with a termination of the transfer of the data object. Such limited duration data flows may exist for a number of sample periods, such that a length of the data-flow record, e.g., the binary vector, has a length corresponding to the number of samples. As transfers of data objects across a network may vary in size, it is understood that lengths of the binary vector may vary according to the size or length of the particular packet flow. Alternatively, or in addition, a sample or observation window may be determined in which instance, the data-flow record size may be limited and/or otherwise fixed to the sample or observation window size. Consider an observation window of 8 seconds of packet traffic sampled at 500 msec, resulting in a data-flow record having a 16-bit, or 2 byte binary vector. Such limited and/or otherwise fixed sample or observation windows may be employed for length transactions and/or for real-time data flows, such as those used for VoIP.

According to the example network monitoring process 260, the data flow may be analyzed at 270 to determine whether the particular data flow may represent a good candidate for evaluating a network performance parameter. Analysis of the data flow may include, without limitation, a determination of an activity level within the sample or observation window of the data flow. For example, those data flows having an activity level above some threshold may be identified as suitable candidates for further analyses. Without limitation, an activity level may be determined by a total number of samples indicating activity, a total number of samples indicting inactivity, a comparison of the total number of samples indicating activity to the total number of samples indicating inactivity, a percentage of samples of a packet flow indicating activity and/or inactivity.

A suitable, or good candidate flow may be defined as one in which there are no, or minimal, idle bits. This essentially means that a count of zeros in a bit-vector has to be 0 or very few. For example, in an 8-second flow, a bit-vector 11000011 has four zeros, which represents 50% of all bits, while 11111110 only has one zero, representing $\frac{1}{8}^{th}$ of the overall flow. The second flow may be considered as a suitable candidate, whereas the first would not. The example second flow suggests a sustained data transfer where achievable network throughput could have been achieved. The first flow has too much idle time, so over the duration of the flow, there would have been impossible to achieve and measure full network bandwidth. Too much idle time could mean that there were separate transactions or separate requests and responses inside the identified data flow.

In at least some embodiments, suitability of a particular data flow may depend on an arrangement and/or location of samples indicating activity and/or inactivity within the data-flow record. For example, data-flow records having periods of inactivity that occur at a start and/or an end of the sample or observation window may be considered as suitable candidates, since the leading or trailing 0's of a corresponding binary activity vector may be ignored and/or otherwise removed from the analysis. Alternatively or in addition, an occurrence of a limited number of 0's, representing a limited number of idle samples, may be tolerable, such that a data-flow record having fewer than an allowable or threshold value may be considered as suitable candidates, whereas data-flow records exceeding such a threshold may not. Without limitation, other patterns of activity-inactivity may be tolerable, such as an inactive sample or limited number of inactive samples, e.g., 0's, occurring after a threshold number of active samples, e.g., 1's, may be tolerable, such that the corresponding data-flow records may be suitable for further analysis.

An evaluation of suitability of a particular data flow may be performed at 272, e.g., according to the analysis at step 270. To the extent that a particular data flow is not considered to represent a suitable candidate at 272 for further analyses, the network monitoring process 260 may return to monitoring subsequent network traffic at 262, and analyzing the subsequently monitored network traffic as disclosed herein. However, to the extent that the particular data flow is considered to represent a suitable candidate at 272, one or more network performance parameters may be calculated and/or derived and/or otherwise determined at 274. According to an illustrative example, and without limitation, the data flow parameter may include a network throughput between the IP addresses of the particular data flow. The example throughput calculation may be determined by identifying and/or otherwise estimating a quantity, volume or amount of data transported during the particular data flow along with a time duration of the data flow. The network throughput may be determined as a quotient of the total data of the particular data flow divided by the duration of the data flow, to obtain a value of bytes/second representative of the network throughput at a time of the data flow.

In at least some embodiments, one or more of the data-flow records and/or indications of suitability may be stored at 276 (shown in phantom). It is understood that one or more steps of the illustrative network monitoring process 260 may be performed in real time, in near real time and/or at a later time, e.g., according to post processing. For example, samples may be obtained in real time, along with identifications of data flows and generations of data-flow records. In at least some embodiments, data-flow records may be stored prior to determining whether a particular data flow is a suitable candidate for further analyses. Alternatively or in addition, data-flow records may be stored subsequent to determining whether the particular data flow is suitable, therefore relieving storage requirements and/or subsequent processing requirements to those data flows that represent suitable candidates.

In at least some embodiments, stored data-flow records may include records of sample activity and/or inactivity, e.g., the binary activity vectors, whereas, in other instances, the binary activity vectors are not retained once a particular sample has been identified as a suitable candidate for further analyses. In either instance, stored data-flow records may include one or more additional informational items, such as a start time, an end time, and/or a duration time of the corresponding data flow and/or sample observation window. Alternatively or in addition, stored data-flow records may include a total quantity, volume or amount of data transferred during the data flow and/or the sample or observation window. Still other information items may include a time of day, network status information, e.g., network traffic volume, congestion, latency, and so on.

Figure 2D:
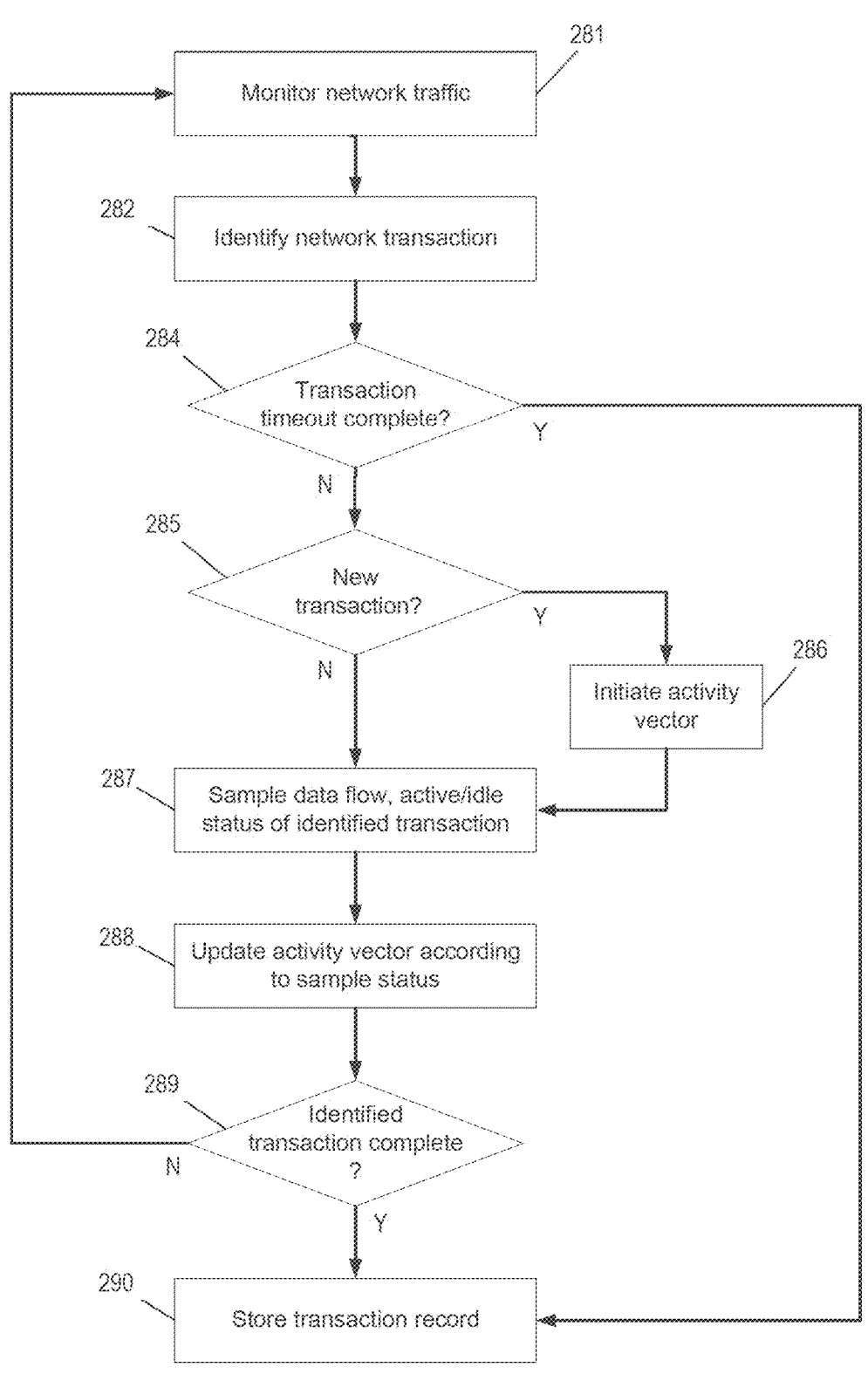
FIG. 2D depicts an illustrative embodiment of another network monitoring process in accordance with various aspects described herein.

FIG. 2D depicts an illustrative embodiment of another network monitoring process 280 in accordance with various aspects described herein. According to the example network monitoring process 280, network traffic is monitored at 281.

It is envisioned that such monitoring may occur according to a sample interval. The sample interval may be a fixed duration interval, e.g., a fraction of a second, a second, and/or a number of seconds. A duration of the sample interval may be determined according to the network traffic. For example, the network traffic may include exchanges of packets of fixed and/or varying size or length. In such instances, a nominal packet size may be determined, such that the sample size is selected and/or otherwise determined according to the nominal packet size. A duration of the sample period may be selected and/or otherwise determined to be shorter than the nominal packet size, and/or to be approximately equal to the nominal packet size, and/or to be larger than the nominal packet size, e.g., according to some multiplier, e.g., two, six, ten, one hundred, and so on.

Network transactions may be identified at 282, e.g., according to source and destination addresses, and a determination made at 284 as to whether a transaction timeout has occurred. It is envisioned that transactions involving an exchange of objects across the network will include a transaction start time and end time. Since the end time may not be known beforehand, an end time may be identified as a time of a last packet of the identified network transaction. The last packet may be determined according to a timeout value. For example, a timer may be initiated after receipt of each packet of an identified transaction. The time may be reset upon receipt of each subsequent packet of the identified transaction. An expiration of the timeout value may be determined according to the time exceeding the timeout value before another packet is observed between the same network endpoints of an identified data flow. By using such a timer, individual data flows of each of multiple objects of a single transaction may be distinguished, permitting analysis of each individual data flow to better estimate network performance parameters, such as throughput.

To the extent it is determined at 284 that a transaction has completed according to an expiration of a timeout timer, the process may proceed to store a data-flow record at 290. However, to the extent it is determined at 284 that the transaction has not yet completed, the network monitoring process 280 evaluates at 285 whether the network traffic may represent a new data flow. By way of example, a new data flow may be identified upon monitoring a data packet of the network traffic that identifies a pair of IP addresses not yet associated with an ongoing data flow. Likewise, an existing data flow may be identified upon monitoring the data packet of the network traffic that identifies a pair of IP address associated with an ongoing data flow and before expiration of any timeout timer.

To the extent it is determined at 285 that the network traffic corresponds to a new data flow, a record of the data flow may be generated and/or otherwise stored. Alternatively or in addition, a corresponding data-flow record, e.g., including a data-flow activity vector, may be initiated at 286, allowing activity status of the identified data flow to be sampled at 287. To the extent it is determined at 285 that the network traffic corresponds to an existing and/or previously identified data flow, the network monitoring process 280 proceeds to sample the activity status of the identified data flow at 287.

In at least some embodiments, the data-flow activity record, e.g., a binary activity vector, may be updated at 288 according to subsequent samples of the identified data flow. Such updating may continue for subsequent samples, until tie network monitoring process 280 concludes that the identified data flow has ended, e.g., a time has exceeded a transaction timeout value.

A further determination is made at 289 as to whether the identified action is completed. Once again, this determination may be arrived at according to an expiration of a timeout timer and/or according to a number of samples reaching and/or exceeding a maximum sample size. To the extent it is determined at 289 that the transaction is complete, a data-flow records may be stored at 290. To the extent it is determined at 289 that the transaction is not yet complete, the process may return to monitoring subsequent samples of network activity at 281.

While for purposes of simplicity of explanation, the respective processes are shown and described as a series of blocks in FIGS. 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

By way of example, a good candidate of long flow for throughput computation (per-second bit-vector) may be represented by the following example data-flow, binary descriptor: 1011 1111 1111 1100, for which 1's represent sampled periods of data flow activity and 0's represent periods of data flow inactivity, or idleness. The example data-flow descriptor includes 16 bits, obtained for a sample size of one sample per second. Accordingly, the 16-bit data-flow descriptor represents activity over a 16 second observation period. The example 16-second flow is mostly active throughout and its idle time occurs mostly towards the end of the flow. A throughput for this example of a good candidate may be determined as a corresponding data transfer size in bytes divided by 14 seconds, e.g., leaving off the trailing 2 seconds, which correspond to idle periods, i.e., not data transfer.

Another example considers an unsuitable or "poor" candidate for any metric computation utilizing the per-second bit-vector: 1110 0111 1001 1111 0001 1110. This 24 bit data flow descriptor represents a 24-second flow, sampled at 1-second intervals. The example flow includes sample periods of activity and inactivity that are generally interleaved. According to the example bit vector, there are 16 ones and 8 zeros, which results in an idle time, i.e., 8 seconds, corresponding to ⅓ of the overall 24 second transmission time. Similar data-flow descriptors may be observed for an adaptive bit rate (ABR) video flow. It is generally recognized that such interleaved periods of activity and inactivity in which the proportion of inactivity is substantial, would not be suitable data flows as corresponding throughput calculations would represent network bandwidth well.

In yet another example of a data-flow descriptor or bit vector is represented by: 0111 1111 1100. The example descriptor was obtained using quarter-second sampling, i.e., 250 msec, to obtain a per-quarter-second bit-vector, representing a 3 second observation period. The example 3-second flow has activity over 2.25 seconds, with the activity occurring in contiguous sample periods. The leading and trailing zeros may be dropped such that the transmission time is determined as 2.25 seconds. Accordingly, the example data flow represents a suitable candidate for a small download time.

Application of the techniques disclosed herein provide a network operator with an understanding of customer behavior, usage and/or video experience even when the network data is encrypted and/or otherwise obfuscated. Such insight into the end user experience and behavior provides the network operator with an ability to plan and/or engineer the network and/or to manage the network traffic accordingly. The techniques also offer network operators with a potential to monetize such insight by adapting customer plans to conditions prevailing in different markets, to licensing related technology to vendors of user experience analytics tools, and as an alternative to vendors offering similar monitoring solutions and tools.

Figure 3:
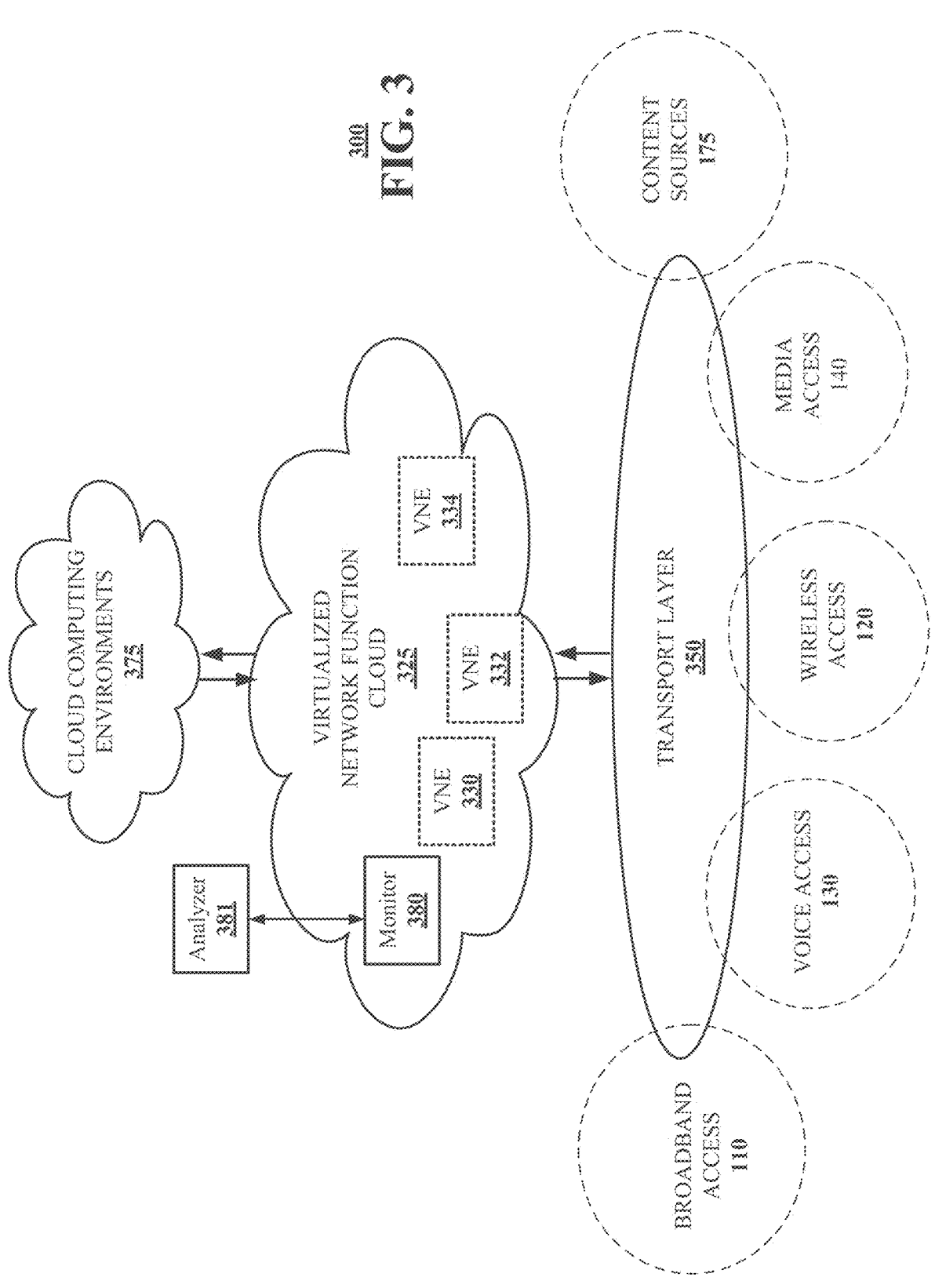
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of the communication system 100, the subsystems and functions of the network monitoring system 200, the sampled data 220 and the network monitoring processes 260, 280 presented in FIGS. 1, 2A, 2B, 2C, 2D and 3. For example, virtualized communication network 300 can facilitate in whole or in part identifying a flow of data packets between first and second network addresses of a network, with each packet including respective header and payload portions. The identified flow of data packets is monitored over a number of sample periods to obtain a number of monitored results. A data-flow activity record is generated, having a number of symbols corresponding to the number of monitored results, the symbols including an active symbol value indicative of a presence of an exchange of data and an idle symbol value indicative of an absence of an exchange of data. A suitability of the identified data flow is inferred for estimating a throughput of the network according to the data-flow activity record without interpreting contents of each respective packet payload portion.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

In at least some embodiments, the system 300 includes one or more of a network monitor 380 and a data-flow analyzer 381. One or more of the network monitor 380 and/or the data-flow analyzer 381 may be implemented in whole or in part within the virtualized network function cloud 325, e.g., as one or more of the example VNEs 330, 332, 334. In at least some embodiments, one or more of the example network monitor 308 and/or data-flow analyzer 381 may function according to the network monitor 180 and/or the data-flow analyzer 181 (FIG. 1) and/or the network monitoring processes 260, 280 (FIGS. 2C and 2D) disclosed herein.

In at least some embodiments, the network monitor 180, 380 and the data-flow analyzer 181, 381 may be combined within a common device, system and/or subsystem. Alternatively or in addition, the network monitor 180, 380 and the data-flow analyzer 181, 381 may be separate devices, systems and/or subsystems. For example, multiple network monitors 180, 380 may be deployed at various network locations, each adapted to observe network traffic that may be observable at the deployed location(s). The multiple network monitors 180, 380 may be adapted to provide indications of the monitored traffic, e.g., data-flow records, to the same data-flow analyzer 181, 381. For example, a single data-flow analyzer 181, 381 may receive data-flow records from multiple network monitors 180, 380, thereby facilitating a centralization of analyses adapted to evaluate network performance based on the sampled network traffic. In some embodiments, suitability of a monitored data flow for evaluating network performance may be determined at the network monitor(s) 180, 380, such that only data-flow records of suitable data flows may be provided to the data-flow analyzer(s) 181, 381 for further analyses. Such distribution of the processing steps may enhance network efficiency by avoiding network transport of data-flow records for any candidates that may be considered unsuitable for further analyses.

Figure 4:
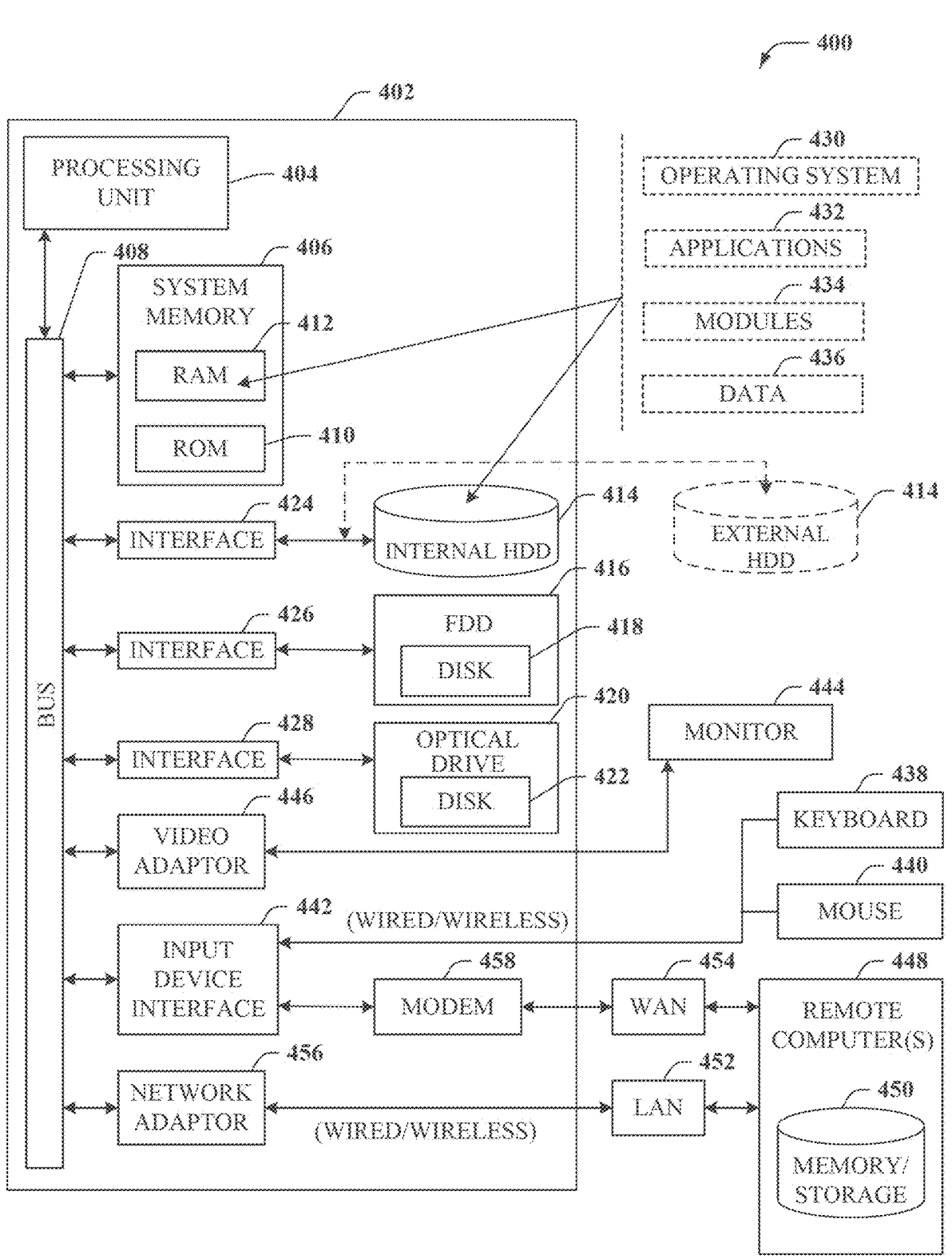
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identifying a flow of data packets between first and second network addresses of a network, with each packet including respective header and payload portions. The identified flow of data packets is monitored over a number of sample periods to obtain a number of monitored results. A data-flow activity record is generated, having a number of symbols corresponding to the number of monitored results, the symbols including an active symbol value indicative of a presence of an exchange of data and an idle symbol value indicative of an absence of an exchange of data. A suitability of the identified data flow is inferred for estimating a throughput of the network according to the data-flow activity record without interpreting contents of each respective packet payload portion.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT, and/or 100BaseT wired Ethernet networks used in many offices.

Figure 5:
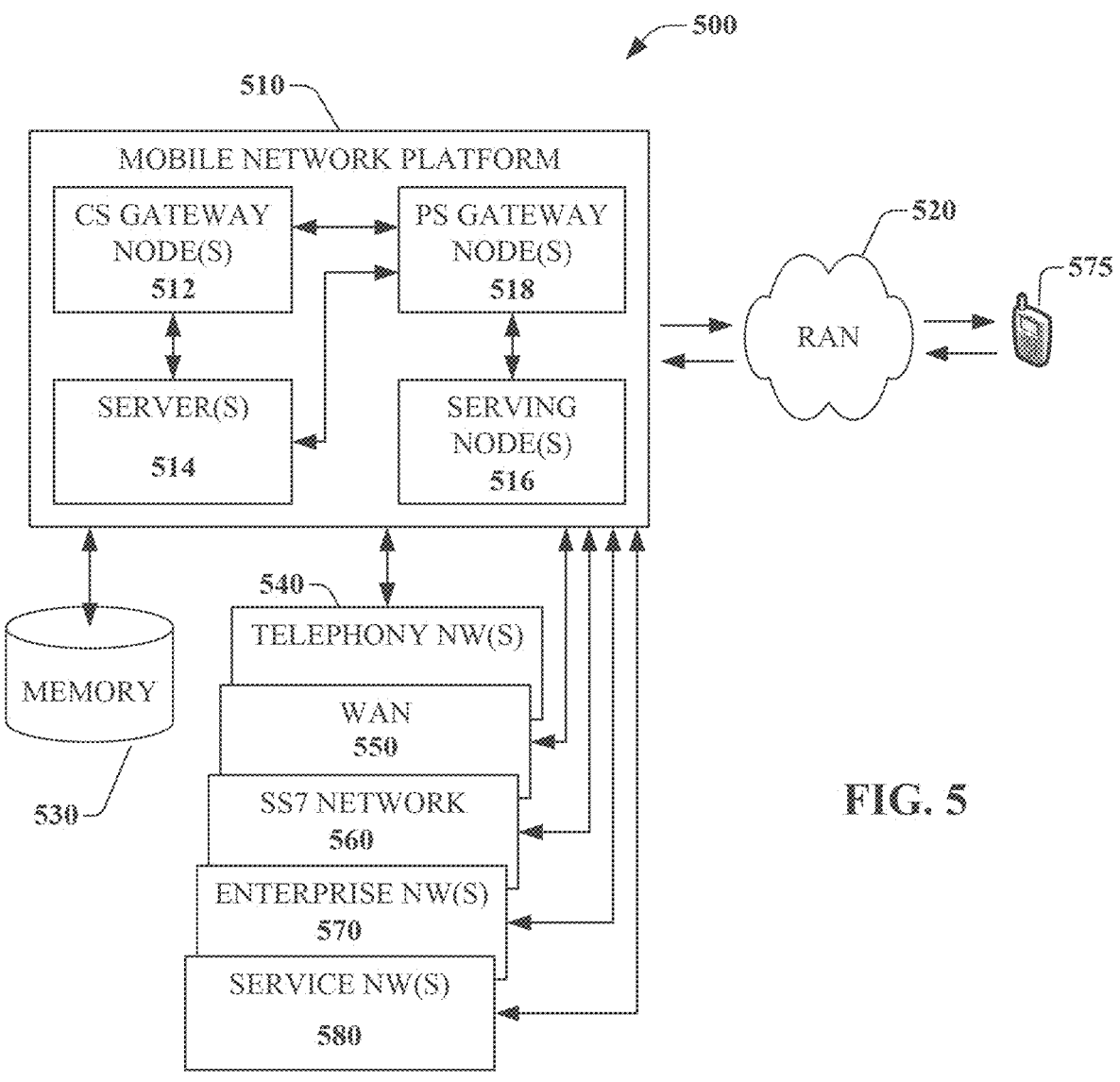
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying a flow of data packets between first and second network addresses of a network, with each packet including respective header and payload portions. The identified flow of data packets is monitored over a number of sample periods to obtain a number of monitored results. A data-flow activity record is generated, having a number of symbols corresponding to the number of monitored results, the symbols including an active symbol value indicative of a presence of an exchange of data and an idle symbol value indicative of an absence of an exchange of data. A suitability of the identified data flow is inferred for estimating a throughput of the network according to the data-flow activity record without interpreting contents of each respective packet payload portion. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
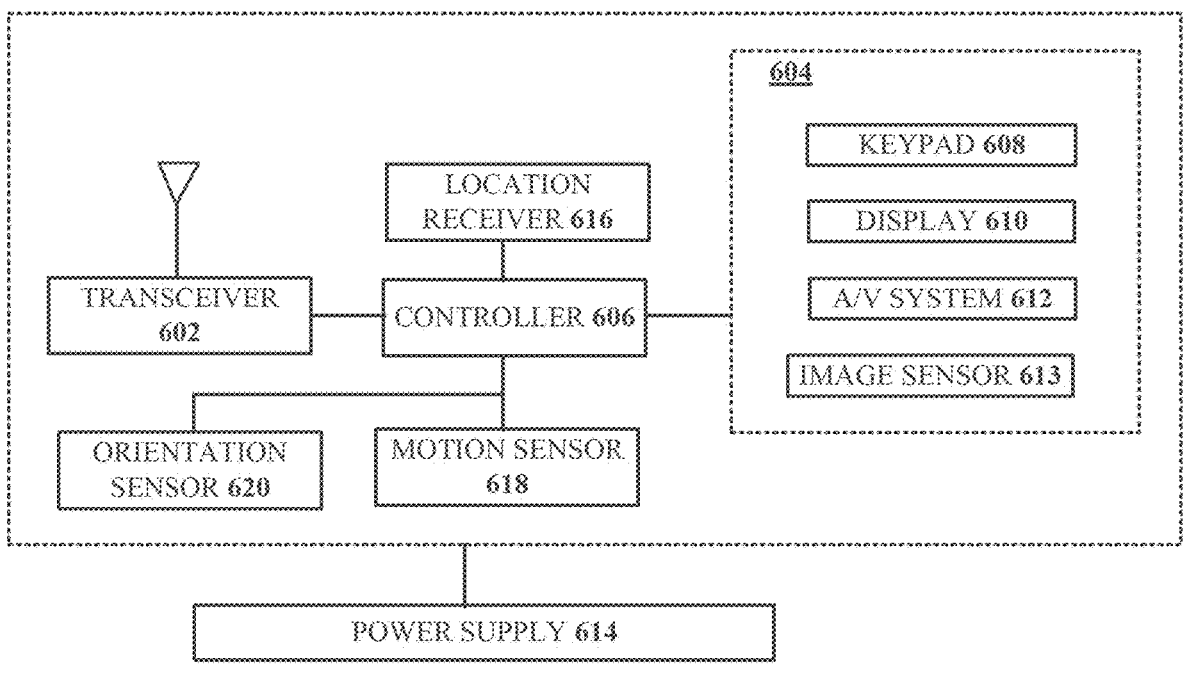
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part identifying a flow of data packets between first and second network addresses of a network, with each packet including respective header and payload portions. The identified flow of data packets is monitored over a number of sample periods to obtain a number of monitored results. A data-flow activity record is generated, having a number of symbols corresponding to the number of monitored results, the symbols including an active symbol value indicative of a presence of an exchange of data and an idle symbol value indicative of an absence of an exchange of data. A suitability of the identified data flow is inferred for estimating a throughput of the network according to the data-flow activity record without interpreting contents of each respective packet payload portion.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

identifying, by a processing system including a processor, a data flow to obtain an identified data flow comprising an exchange of a plurality of packets across a network, between a first device having a first network address and a second device having a second network address, each packet of the plurality of packets comprising a respective packet header portion that identifies the first and second network addresses and a respective packet payload portion;

monitoring, by the processing system, the identified data flow over a plurality of successive sample periods to obtain a plurality of monitored results, each respective monitored result of the plurality of monitored results corresponding to a respective sample period of the plurality of successive sample periods, each monitored result of the plurality of monitored results indicating a presence or absence of an exchange of data of the identified data flow during a corresponding respective sample period of the plurality of successive sample periods;

generating, by the processing system, a data-flow activity vector comprising a plurality of binary symbols, each respective symbol of the plurality of binary symbols corresponding to a respective monitored result of the plurality of monitored results, each respective symbol of the plurality of binary symbols comprising either an active symbol value or an idle symbol value, wherein the active symbol value is indicative of the presence of the exchange of data of the identified data flow and the idle symbol value is indicative of the absence of the exchange of data of the identified data flow; and determining, by the processing system, a suitability of the identified data flow for determining a throughput of the network according to the data-flow activity vector without interpreting contents of a respective packet payload portion of each packet of the plurality of packets, wherein the determining the suitability of the identified data flow comprises:

removing leading idle symbol values of the data-flow activity vector and removing trailing idle symbol values of the data-flow activity vector, forming an adjusted data flow activity vector, identifying a predetermined activity threshold, determining a total number of symbols of the plurality of binary symbols of the adjusted data flow activity vector having the active symbol value, comparing the total number of symbols of the plurality of binary symbols of the adjusted data flow activity vector having the active symbol value with the predetermined activity threshold, identifying the identified data flow as a suitable data flow for determining the throughput of the network based on the comparing, in response to the identifying the identified data flow as a suitable data flow, determining a data volume of the identified data flow, in response to the identifying the identified data flow as a suitable data flow, determining a duration of the adjusted data flow activity vector, and determining the throughput of the network based on the data volume of the identified data flow and the duration of the adjusted data flow activity vector.

2. The method of claim 1, wherein the respective packet payload portion of each packet the plurality of packets comprises encrypted data, and wherein the monitoring of the identified data flow to obtain the plurality of monitored results is performed without decrypting the encrypted data.

3. The method of claim 1, further comprising:

calculating, by the processing system, a measure of data-flow activity comprising a first number of symbols of the plurality of binary symbols comprising the active symbol value; and calculating, by the processing system, a measure of data-flow inactivity comprising a second number of symbols of the plurality of binary symbols comprising the idle symbol value.

4. The method of claim 3, wherein the determining the suitability of the identified data flow further comprises:

comparing the measure of data-flow activity to an activity threshold.

5. The method of claim 3, wherein the determining the suitability of the identified data flow further comprises:

comparing, by the processing system, the measure of data-flow activity to the measure of data-flow inactivity.

6. The method of claim 5, further comprising:

identifying, by the processing system, a conclusion of the identified data flow, wherein the determining the suitability of the identified data flow occurs after the conclusion of the identified data flow.

7. The method of claim 1, wherein a length of the data-flow activity vector is determined according to a duration of the identified data flow.

8. The method of claim 1, wherein a length of a sample period of the successive sample periods comprises a fixed duration.

9. The method of claim 1, wherein the determining the suitability of the identified data flow occurs without accessing data of the respective packet payload portion of each packet of the plurality of packets.

10. The method of claim 1, wherein the plurality of binary symbols comprises a binary '1' representing one of the active symbol value and the idle symbol value and a binary '0' representing a different one of the active symbol value and the idle symbol value, the data-flow activity vector comprising a successive string of 1's and/or 0's, each 1 indicating data flow activity and each 0 indicating data flow inactivity, during each respective sample period of the plurality of successive sample periods.

11. The method of claim 10, further comprising:

removing, by the processing system, preceding zeros of the data-flow activity vector; and removing, by the processing system, trailing zeros of the data-flow activity vector.

12. The method of claim 11, further comprising:

adjusting, by the processing system, a duration of the data flow according to the removing the preceding zeros of the data-flow activity vector and the removing the trailing zeros of the data-flow activity vector.

13. The method of claim 1, wherein the identifying of the data flow further comprises:

identifying, by the processing system and from the respective packet header portion of each packet of the plurality of packets, the first network address of the first device as a data object source address and the second network address of the second device as a data object target address; and associating the data object source address and the data object target address with the identified data flow.

14. A device, comprising:

a processing system including a processor; and a memory that stores executable instructions that, when executed by the processing system, facilitate performance of operations, the operations comprising:

identifying a data flow to obtain an identified data flow comprising an exchange of a plurality of packets between first and second network addresses of a network, each packet of the plurality of packets comprising a respective packet header portion that identifies the first and second network addresses and a respective packet payload portion;

monitoring the identified data flow over a plurality of successive sample periods to obtain a plurality of monitored results, each monitored result of the plurality of monitored results indicating a presence or absence of an exchange of data of the identified data flow during a respective sample period of the plurality of successive sample periods;

generating a data-flow activity record comprising a plurality of binary symbols, wherein respective symbols of the plurality of binary symbols correspond to respective monitored results of the plurality of monitored results, wherein respective symbols of the plurality of binary symbols comprise one of a first symbol value indicative of the presence of the exchange of data of the identified data flow or a second symbol value indicative of the absence of the exchange of data of the identified data flow; and determining a suitability of the identified data flow for estimating a throughput of the network according to the data-flow activity record without interpreting contents of the respective packet payload portion of each packet of the plurality of packets, wherein the determining the suitability of the identified data flow for estimating the throughput of the network according to the data-flow activity record comprises:

removing leading idle symbol values of the data-flow activity record and removing trailing idle symbol values of the data-flow activity record, forming an adjusted data flow activity record, identifying a predetermined activity threshold, determining a total number of symbols of the adjusted data flow activity record having the first symbol value, comparing the total number of symbols having the first symbol value with the predetermined activity threshold, identifying the identified data flow as a suitable data flow for estimating the throughput of the network based on the comparing in response to the identifying the identified data flow as a suitable data flow, determining a data volume of the identified data flow, in response to the identifying the identified data flow as a suitable data flow, determining a duration of the adjusted data flow activity record, and determining the throughput of the network based on the data volume of the identified data flow and the duration of the adjusted data flow activity record.

15. The device of claim 14, wherein the operations further comprise:

calculating a measure of data-flow activity comprising a first number of symbols of the plurality of binary symbols comprising the first symbol value; and calculating a measure of data-flow inactivity comprising a second number of symbols of the plurality of binary symbols comprising the second symbol value.

16. The device of claim 15, wherein the determining the suitability of the identified data flow is based on one of the measure of data-flow activity, the measure of data-flow inactivity, or both.

17. The device of claim 14, wherein the determining the suitability of the identified data flow occurs without accessing any data of the respective packet payload portion of each packet of the plurality of packets.

18. A non-transitory, machine-readable medium, comprising executable instructions that, when executed by a processing system including a processor, facilitate performance of operations, the operations comprising:

identifying a data flow to obtain an identified data flow comprising an exchange of a plurality of packets between first and second network addresses of a network, each packet of the plurality of packets comprising a respective header portion and a respective payload portion;

monitoring the identified data flow over a plurality of sample periods to obtain a plurality of monitored results;

generating a data-flow activity record comprising a plurality of binary symbols, each respective symbol of the plurality of binary symbols corresponding to a respective monitored result of the plurality of monitored results, each respective symbol of the plurality of binary symbols comprising either an active symbol value indicative of a presence of an exchange of data of the identified data flow or an idle symbol value indicative of an absence of an exchange of data of the identified data flow; and determining a suitability of the identified data flow for estimating a throughput of the network according to the data-flow activity record without interpreting contents of each respective packet payload portion, wherein the determining the suitability of the identified data flow comprises:

removing leading idle symbol values of the data-flow activity record and removing trailing idle symbol values of the data-flow activity record, forming an adjusted data flow activity record, selecting a predetermined activity threshold for the identified data flow, determining a total number of symbols of the plurality of binary symbols of the adjusted data flow activity record having the active symbol value, comparing the total number of symbols of the plurality of binary symbols of the adjusted data flow activity record having the active symbol value with the predetermined activity threshold, identifying the identified data flow as a suitable data flow for determining the throughput of the network based on the comparing, in response to the identifying the identified data flow as a suitable data flow, determining a data volume of the identified data flow, in response to the identifying the identified data flow as a suitable data flow, determining a duration of the adjusted data flow activity record, and determining the throughput of the network based on the data volume of the identified data flow and the duration of the adjusted data flow activity record.

19. The non-transitory, machine-readable medium of claim 18, wherein the operations further comprise:

calculating a measure of data-flow activity comprising a first number of symbols of the plurality of binary symbols comprising the active symbol value; and calculating a measure of data-flow inactivity comprising a second number of symbols of the plurality of binary symbols comprising the idle symbol value.

20. The non-transitory, machine-readable medium of claim 19, wherein the determining the suitability of the identified data flow is based on one of the measure of data-flow activity, the measure of data-flow inactivity, or both.

\* \* \* \* \*